(12) United States Patent
Thomsen et al.

(10) Patent No.: US 9,830,913 B2
(45) Date of Patent: Nov. 28, 2017

(54) VAD DETECTION APPARATUS AND METHOD OF OPERATION THE SAME

(71) Applicant: Knowles Electronics, LLC, Itasca, IL (US)

(72) Inventors: Henrik Thomsen, Holte (DK); Dibyendu Nandy, Naperville, IL (US)

(73) Assignee: Knowles Electronics, LLC, Itasca, IL (US)

( * ) Notice: Subject to any disclaimer, the term of this patent is extended or adjusted under 35 U.S.C. 154(b) by 10 days.

(21) Appl. No.: 14/861,113

(22) Filed: Sep. 22, 2015

(65) Prior Publication Data

US 2016/0064001 A1    Mar. 3, 2016

Related U.S. Application Data

(63) Continuation of application No. 14/525,413, filed on Oct. 28, 2014, now Pat. No. 9,147,397.

(Continued)

(51) Int. Cl.
| | |
|---|---|
| *G10L 15/00* | (2013.01) |
| *G10L 17/02* | (2013.01) |
| *G10L 15/22* | (2006.01) |
| *H04W 4/16* | (2009.01) |
| *G10L 15/08* | (2006.01) |

(Continued)

(52) U.S. Cl.
CPC ............. *G10L 17/02* (2013.01); *G10L 15/08* (2013.01); *G10L 15/22* (2013.01); *G10L 19/0204* (2013.01); *G10L 25/21* (2013.01); *H04R 3/005* (2013.01); *H04R 19/04* (2013.01); *H04W 4/16* (2013.01); *G10L 25/78* (2013.01); *G10L 2015/088* (2013.01)

(58) Field of Classification Search
CPC ............ G10L 15/22; G10L 25/78; H04R 9/08
USPC ........................................................ 704/246
See application file for complete search history.

(56) References Cited

U.S. PATENT DOCUMENTS

| | | |
|---|---|---|
| 4,052,568 A | 10/1977 | Jankowski |
| 5,577,164 A | 11/1996 | Kaneko |

(Continued)

FOREIGN PATENT DOCUMENTS

| | | |
|---|---|---|
| JP | 2001-236095 | 8/2001 |
| JP | 2004219728 | 8/2004 |

(Continued)

OTHER PUBLICATIONS

U.S. Appl. No. 14/285,585, filed May 22, 2014, Santos.

(Continued)

*Primary Examiner* — Daniel Abebe
(74) *Attorney, Agent, or Firm* — Foley & Lardner LLP

(57) ABSTRACT

A microphone assembly includes an acoustic sensor and a voice activity detector on an integrated circuit coupled to an external-device interface. The acoustic sensor produces an electrical signal representative of acoustic energy detected by the sensor. A filter bank separates data representative of the acoustic energy into a plurality of frequency bands. A power tracker obtains a power estimate for at least one band, including a first estimate based on relatively fast changes in a power metric of the data and a second estimate based on relatively slow changes in a power metric of the data. The presence of voice activity in the electrical signal is based upon the power estimate.

20 Claims, 8 Drawing Sheets

US 9,830,913 B2

Page 2

Related U.S. Application Data

(60) Provisional application No. 61/896,723, filed on Oct. 29, 2013.

(51) Int. Cl.
   *G10L 19/02* (2013.01)
   *G10L 25/21* (2013.01)
   *H04R 3/00* (2006.01)
   *H04R 19/04* (2006.01)
   *G10L 25/78* (2013.01)

(56) References Cited

U.S. PATENT DOCUMENTS

| | | |
|---|---|---|
| 5,598,447 A | 1/1997 | Usui |
| 5,675,808 A | 10/1997 | Gulick |
| 5,822,598 A | 10/1998 | Lam |
| 5,983,186 A | 11/1999 | Miyazawa |
| 6,049,565 A | 4/2000 | Paradine |
| 6,057,791 A | 5/2000 | Knapp |
| 6,070,140 A | 5/2000 | Tran |
| 6,138,040 A * | 10/2000 | Nicholls ............... H04M 9/08 379/390.01 |
| 6,154,721 A | 11/2000 | Sonnic |
| 6,249,757 B1 | 6/2001 | Cason |
| 6,282,268 B1 | 8/2001 | Hughes |
| 6,324,514 B2 | 11/2001 | Matulich |
| 6,397,186 B1 | 5/2002 | Bush |
| 6,453,020 B1 | 9/2002 | Hughes |
| 6,564,330 B1 | 5/2003 | Martinez |
| 6,591,234 B1 | 7/2003 | Chandran |
| 6,640,208 B1 | 10/2003 | Zhang |
| 6,665,639 B2 | 12/2003 | Mozer et al. |
| 6,756,700 B2 | 6/2004 | Zeng |
| 6,832,194 B1 | 12/2004 | Mozer et al. |
| 6,999,927 B2 | 2/2006 | Mozer et al. |
| 7,092,887 B2 | 8/2006 | Mozer et al. |
| 7,190,038 B2 | 3/2007 | Dehe |
| 7,415,416 B2 | 8/2008 | Rees |
| 7,418,392 B1 | 8/2008 | Mozer et al. |
| 7,473,572 B2 | 1/2009 | Dehe |
| 7,487,089 B2 | 2/2009 | Mozer |
| 7,619,551 B1 | 11/2009 | Wu |
| 7,630,504 B2 | 12/2009 | Poulsen |
| 7,720,683 B1 | 5/2010 | Vermeulen et al. |
| 7,774,202 B2 | 8/2010 | Spengler |
| 7,774,204 B2 | 8/2010 | Mozer et al. |
| 7,781,249 B2 | 8/2010 | Laming |
| 7,795,695 B2 | 9/2010 | Weigold |
| 7,801,729 B2 | 9/2010 | Mozer |
| 7,825,484 B2 | 11/2010 | Martin |
| 7,829,961 B2 | 11/2010 | Hsiao |
| 7,856,283 B2 | 12/2010 | Burk |
| 7,856,804 B2 | 12/2010 | Laming |
| 7,903,831 B2 | 3/2011 | Song |
| 7,936,293 B2 | 5/2011 | Hamashita |
| 7,941,313 B2 | 5/2011 | Garudadri |
| 7,957,972 B2 | 6/2011 | Huang |
| 7,994,947 B1 | 8/2011 | Ledzius |
| 8,024,195 B2 | 9/2011 | Mozer et al. |
| 8,036,901 B2 | 10/2011 | Mozer |
| 8,099,289 B2 | 1/2012 | Mozer et al. |
| 8,112,280 B2 | 2/2012 | Lu |
| 8,171,322 B2 | 5/2012 | Fiennes |
| 8,195,467 B2 | 6/2012 | Mozer et al. |
| 8,208,621 B1 | 6/2012 | Hsu |
| 8,275,148 B2 | 9/2012 | Li |
| 8,321,219 B2 | 11/2012 | Mozer |
| 8,331,581 B2 | 12/2012 | Pennock |
| 8,645,132 B2 | 2/2014 | Mozer et al. |
| 8,645,143 B2 | 2/2014 | Mozer |
| 8,666,751 B2 | 3/2014 | Murthi |
| 8,687,823 B2 | 4/2014 | Loeppert |
| 8,700,399 B2 | 4/2014 | Vermeulen et al. |
| 8,731,210 B2 | 5/2014 | Cheng |
| 8,768,707 B2 | 7/2014 | Mozer |
| 8,781,825 B2 | 7/2014 | Shaw et al. |
| 8,798,289 B1 | 8/2014 | Every |
| 8,804,974 B1 | 8/2014 | Melanson |
| 8,849,231 B1 | 9/2014 | Murgia |
| 8,972,252 B2 | 3/2015 | Hung |
| 8,996,381 B2 | 3/2015 | Mozer et al. |
| 9,020,819 B2 | 4/2015 | Saitoh |
| 9,043,211 B2 | 5/2015 | Haiut |
| 9,059,630 B2 | 6/2015 | Gueorguiev |
| 9,073,747 B2 | 7/2015 | Ye |
| 9,076,447 B2 | 7/2015 | Nandy |
| 9,111,548 B2 | 8/2015 | Nandy |
| 9,112,984 B2 | 8/2015 | Sejnoha |
| 9,113,263 B2 | 8/2015 | Furst |
| 9,119,150 B1 | 8/2015 | Murgia |
| 9,142,215 B2 | 9/2015 | Rosner |
| 9,142,219 B2 | 9/2015 | Mozer |
| 9,147,397 B2 | 9/2015 | Thomsen |
| 9,161,112 B2 | 10/2015 | Ye |
| 9,165,567 B2 * | 10/2015 | Visser ............... G10L 25/78 |
| 9,439,005 B2 * | 9/2016 | Jensen ............... H04R 25/407 |
| 2002/0054588 A1 | 5/2002 | Mehta |
| 2002/0116186 A1 | 8/2002 | Strauss |
| 2002/0123893 A1 | 9/2002 | Woodward |
| 2002/0184015 A1 | 12/2002 | Li |
| 2003/0004720 A1 | 1/2003 | Garudadri |
| 2003/0061036 A1 | 3/2003 | Garudadri |
| 2003/0144844 A1 | 7/2003 | Colmenarez |
| 2004/0022379 A1 | 2/2004 | Klos |
| 2004/0234069 A1 * | 11/2004 | Mikesell ............... H04M 9/082 379/406.01 |
| 2005/0207605 A1 | 9/2005 | Dehe |
| 2005/0240399 A1 * | 10/2005 | Makinen ............... G10L 19/22 704/223 |
| 2006/0074658 A1 | 4/2006 | Chadha |
| 2006/0233389 A1 | 10/2006 | Mao |
| 2006/0247923 A1 | 11/2006 | Chandran |
| 2007/0168908 A1 | 7/2007 | Paolucci |
| 2007/0278501 A1 | 12/2007 | MacPherson |
| 2008/0089536 A1 | 4/2008 | Josefsson |
| 2008/0175425 A1 | 7/2008 | Roberts |
| 2008/0201138 A1 | 8/2008 | Visser |
| 2008/0267431 A1 | 10/2008 | Leidl |
| 2008/0279407 A1 | 11/2008 | Pahl |
| 2008/0283942 A1 | 11/2008 | Huang |
| 2009/0001553 A1 | 1/2009 | Pahl |
| 2009/0180655 A1 | 7/2009 | Tien |
| 2010/0046780 A1 | 2/2010 | Song |
| 2010/0052082 A1 | 3/2010 | Lee |
| 2010/0057474 A1 | 3/2010 | Kong |
| 2010/0128894 A1 | 5/2010 | Petit |
| 2010/0128914 A1 | 5/2010 | Khenkin |
| 2010/0131783 A1 | 5/2010 | Weng |
| 2010/0183181 A1 | 7/2010 | Wang |
| 2010/0246877 A1 | 9/2010 | Wang |
| 2010/0290644 A1 | 11/2010 | Wu |
| 2010/0292987 A1 | 11/2010 | Kawaguchi |
| 2010/0322443 A1 | 12/2010 | Wu |
| 2010/0322451 A1 | 12/2010 | Wu |
| 2011/0007907 A1 | 1/2011 | Park |
| 2011/0013787 A1 | 1/2011 | Chang |
| 2011/0029109 A1 | 2/2011 | Thomsen |
| 2011/0075875 A1 | 3/2011 | Wu |
| 2011/0106533 A1 | 5/2011 | Yu |
| 2011/0150210 A1 * | 6/2011 | Allen ............... H04M 1/58 379/406.08 |
| 2011/0208520 A1 | 8/2011 | Lee |
| 2011/0264447 A1 * | 10/2011 | Visser ............... G10L 25/78 704/208 |
| 2011/0280109 A1 | 11/2011 | Raymond |
| 2012/0010890 A1 | 1/2012 | Koverzin |
| 2012/0052907 A1 | 3/2012 | Gilbreath et al. |
| 2012/0232896 A1 | 9/2012 | Taleb |
| 2012/0250881 A1 | 10/2012 | Mulligan |
| 2012/0310641 A1 | 12/2012 | Niemisto |
| 2013/0044898 A1 | 2/2013 | Schultz |
| 2013/0058506 A1 | 3/2013 | Boor |
| 2013/0183944 A1 | 7/2013 | Mozer et al. |

(56) References Cited

U.S. PATENT DOCUMENTS

| | | |
|---|---|---|
| 2013/0223635 A1 | 8/2013 | Singer |
| 2013/0226324 A1 | 8/2013 | Hannuksela |
| 2013/0246071 A1 | 9/2013 | Lee |
| 2013/0322461 A1 | 12/2013 | Poulsen |
| 2013/0343584 A1 | 12/2013 | Bennett |
| 2014/0064523 A1 | 3/2014 | Kropfitsch |
| 2014/0122078 A1 | 5/2014 | Joshi |
| 2014/0143545 A1 | 5/2014 | McKeeman |
| 2014/0163978 A1 | 6/2014 | Basye |
| 2014/0177113 A1 | 6/2014 | Gueorguiev |
| 2014/0180691 A1 | 6/2014 | Vermeulen et al. |
| 2014/0188467 A1 | 7/2014 | Jing |
| 2014/0188470 A1 | 7/2014 | Chang |
| 2014/0197887 A1 | 7/2014 | Hovesten |
| 2014/0244269 A1 | 8/2014 | Tokutake |
| 2014/0244273 A1 | 8/2014 | Laroche |
| 2014/0249820 A1 | 9/2014 | Hsu |
| 2014/0257813 A1 | 9/2014 | Mortensen |
| 2014/0257821 A1 | 9/2014 | Adams |
| 2014/0274203 A1 | 9/2014 | Ganong |
| 2014/0278435 A1* | 9/2014 | Ganong, III ............ G10L 15/22 704/275 |
| 2014/0281628 A1 | 9/2014 | Nigam |
| 2014/0324431 A1 | 10/2014 | Teasley |
| 2014/0343949 A1 | 11/2014 | Huang |
| 2014/0348345 A1 | 11/2014 | Furst |
| 2014/0358552 A1 | 12/2014 | Xu |
| 2015/0039303 A1 | 2/2015 | Lesso |
| 2015/0043755 A1 | 2/2015 | Furst |
| 2015/0046157 A1 | 2/2015 | Wolff |
| 2015/0046162 A1 | 2/2015 | Aley-Raz |
| 2015/0049884 A1 | 2/2015 | Ye |
| 2015/0055803 A1 | 2/2015 | Qutub |
| 2015/0058001 A1 | 2/2015 | Dai |
| 2015/0063594 A1 | 3/2015 | Nielsen |
| 2015/0073780 A1 | 3/2015 | Sharma |
| 2015/0073785 A1 | 3/2015 | Sharma |
| 2015/0088500 A1 | 3/2015 | Conliffe |
| 2015/0106085 A1 | 4/2015 | Lindahl |
| 2015/0110290 A1 | 4/2015 | Furst |
| 2015/0112690 A1 | 4/2015 | Guha |
| 2015/0134331 A1 | 5/2015 | Millet |
| 2015/0154981 A1 | 6/2015 | Barreda |
| 2015/0161989 A1 | 6/2015 | Hsu |
| 2015/0195656 A1 | 7/2015 | Ye |
| 2015/0206527 A1 | 7/2015 | Connolly |
| 2015/0256660 A1 | 9/2015 | Kaller |
| 2015/0256916 A1 | 9/2015 | Volk |
| 2015/0287401 A1 | 10/2015 | Lee |
| 2015/0302865 A1 | 10/2015 | Pilli |
| 2015/0304502 A1 | 10/2015 | Pilli |
| 2015/0350760 A1 | 12/2015 | Nandy |
| 2015/0350774 A1 | 12/2015 | Furst |
| 2016/0012007 A1 | 1/2016 | Popper |
| 2016/0057549 A1* | 2/2016 | Marquis ................ H03G 3/344 381/315 |
| 2016/0087596 A1 | 3/2016 | Yurrtas |
| 2016/0133271 A1 | 5/2016 | Kuntzman |
| 2016/0134975 A1 | 5/2016 | Kuntzman |

FOREIGN PATENT DOCUMENTS

| | | |
|---|---|---|
| WO | 2009130591 | 1/2009 |
| WO | 2011106065 | 1/2011 |
| WO | 2011140096 | 2/2011 |
| WO | 2013049358 | 1/2013 |
| WO | 2013085499 | 1/2013 |

OTHER PUBLICATIONS

U.S. Appl. No. 14/495,482, filed Sep. 24, 2014, Murgia.
U.S. Appl. No. 14/522,264, filed Oct. 23, 2014, Murgia.
U.S. Appl. No. 14/698,652, filed Apr. 28, 2015, Yapanel.
U.S. Appl. No. 14/749,425, filed Jun. 24, 2015, Verma.
U.S. Appl. No. 14/853,947, filed Sep. 14, 2015, Yen.
U.S. Appl. No. 62/100,758, filed Jan. 7, 2015, Rossum.
International Search Report and Written Opinion for PCT/US2016/013859 dated Apr. 29, 2016 (12 pages).
Search Report of Taiwan Patent Application No. 103135811, dated Apr. 18, 2016 (1 page).
"MEMS technologies: Microphone" EE Herald Jun. 20, 2013.
Delta-sigma modulation, Wikipedia (Jul. 4, 2013).
International Search Report and Written Opinion for PCT/EP2014/064324, dated Feb. 12, 2015 (13 pages).
International Search Report and Written Opinion for PCT/US2014/038790, dated Sep. 24, 2014 (9 pages).
International Search Report and Written Opinion for PCT/US2014/060567 dated Jan. 16, 2015 (12 pages).
International Search Report and Written Opinion for PCT/US2014/062861 dated Jan. 23, 2015 (12 pages).
Kite, Understanding PDM Digital Audio, Audio Precision, Beaverton, OR, 2012.
Pulse-density modulation, Wikipedia (May 3, 2013).

* cited by examiner

VAD DETECTION APPARATUS AND
METHOD OF OPERATION THE SAME

CROSS REFERENCE TO RELATED APPLICATION

This application is a continuation of U.S. application Ser. No. 14/525,413 (now granted as U.S. Pat. No. 9,147,397), entitled "VAD Detection Apparatus and Method of Operating the Same," filed Oct. 28, 2014, which claims the benefit under 35 U.S.C. §119 (e) to U.S. Provisional Application No. 61/896,723, entitled "VAD Detection Apparatus and method of operating the same," filed Oct. 29, 2013, both of which are incorporated herein by reference in their entireties.

TECHNICAL FIELD

This application relates to microphones and, more specifically, to voice activity detection (VAD) approaches used with these microphones.

BACKGROUND

Microphones are used to obtain a voice signal from a speaker. Once obtained, the signal can be processed in a number of different ways. A wide variety of functions can be provided by today's microphones and they can interface with and utilize a variety of different algorithms.

Voice triggering, for example, as used in mobile systems is an increasingly popular feature that customers wish to use. For example, a user may wish to speak commands into a mobile device and have the device react in response to the commands. In these cases, a programmable digital signal processor (DSP) may first use a voice activity detection algorithm to detect if there is voice in an audio signal captured by a microphone, and then, subsequently, analysis is performed on the signal to predict what the spoken word was in the received audio signal. Various voice activity detection (VAD) approaches have been developed and deployed in various types of devices such as cellular phones and personal computers.

In the use of these approaches, false detections, trigger word detections, part counts and silicon area and current consumption have become concerns, especially since these approaches are deployed in electronic devices such as cellular phones. Previous approaches have proven inadequate to address these concerns. Consequently, some user dissatisfaction has developed with respect to these previous approaches.

BRIEF DESCRIPTION OF THE DRAWINGS

For a more complete understanding of the disclosure, reference should be made to the following detailed description and accompanying drawings wherein.

Figure 1:
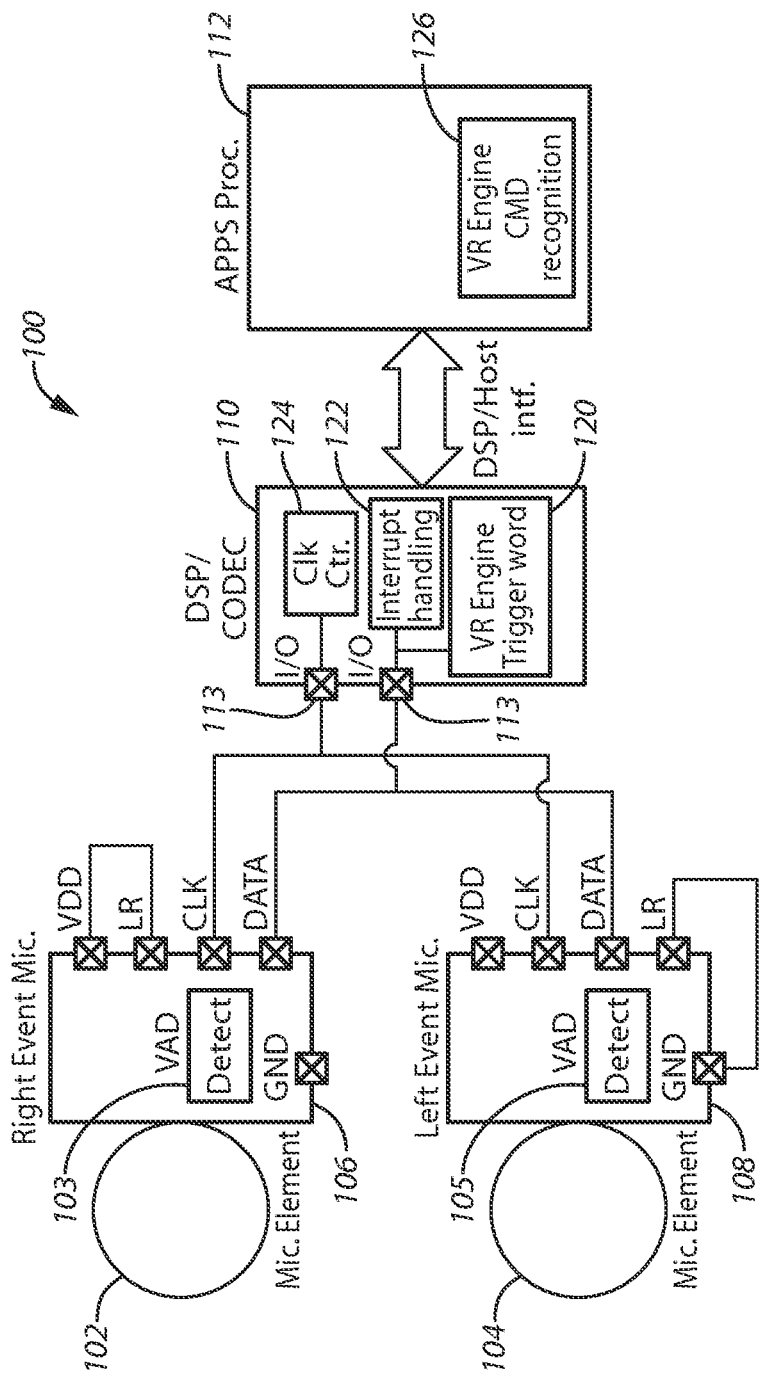
FIG. 1 is a block diagram of a system with microphones that use VAD.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

The present approaches provide voice activity detection (VAD) methods and devices that determine whether an event or human voice is present. The approaches described herein are efficient, easy to implement, lower part counts, are able to detect voice with very low latency, and reduce false detections.

It will be appreciated that the approaches described herein can be implemented using any combination of hardware or software elements. For example, an application specific integrated circuit (ASIC) or microprocessor can be used to implement the approaches described herein using programmed computer instructions. Additionally, while the VAD approaches may be disposed in the microphone (as described herein), these functionalities may also be disposed in other system elements.

In many of these embodiments and at a processing device, a first signal from a first microphone and a second signal from a second microphone are received. The first signal indicates whether a voice signal has been determined at the first microphone, and the second signal indicates whether a voice signal has been determined at the second microphone. When the first signal indicates potential voice activity or the second signal indicates potential voice activity, the processing device is activated to receive data and the data is examined for a trigger word. When the trigger word is found, a signal is sent to an application processor to further process information from one or more of the first microphone and the second microphone. When no trigger word is found, the processing device is reset to deactivate data input and allow the first microphone and the second microphone to enter or maintain an event detection mode of operation.

In other aspects, the application processor utilizes a voice recognition (VR) module to determine whether other or further commands can be recognized in the information. In other examples, the first microphone and the second microphone transmit pulse density modulation (PDM) data.

In some other aspects, the first microphone includes a first voice activity detection (VAD) module that determines whether voice activity has been detected, and the second microphone includes a second voice activity detection (VAD) module that determines whether voice activity has been detected. In some examples, the first VAD module and the second VAD module perform the steps of: receiving sound energy from a source; filtering the sound energy into a plurality of filter bands; obtaining a power estimate for each of the plurality of filter bands; and based upon each power estimate, determining whether voice activity is detected.

In some examples, the filtering utilizes one or more low pass filters, high pass filters, and frequency dividers. In other examples, the power estimate comprises an upper power estimate and a lower power estimate.

In some aspects, either the first VAD module or the second VAD module performs Trigger Phrase recognition. In other aspects, either the first VAD module or the second VAD module performs Command Recognition.

In some examples, the processing device controls the first microphone and the second microphone by varying a clock frequency of a clock supplied to the first microphone and the second microphone.

In many of these embodiments, the system includes a first microphone with a first voice activity detection (VAD) module and a second microphone with a second voice activity detection (VAD) module, and a processing device. The processing device is communicatively coupled to the first microphone and the second microphone, and configured to receive a first signal from the first microphone and a second signal from the second microphone. The first signal indicates whether a voice signal has been determined at the first microphone by the first VAD module, and the second signal indicates whether a voice signal has been determined at the second microphone by the second VAD module. The processing device is further configured, to when the first signal indicates potential voice activity or the second signal indicates potential voice activity, activate and receive data from the first microphone or the second microphone, and subsequently examine the data for a trigger word. When the trigger word is found, a signal is sent to an application processor to further process information from one or more of the first microphone and the second microphone. The processing device is further configured to, when no trigger word is found, transmit a third signal to the first microphone and the second microphone. The third signal causes the first microphone and second microphone to enter or maintain an event detection mode of operation.

In one aspect, either the first VAD module or the second VAD module performs Trigger Phrase recognition. In another aspect, either the first VAD module or the second VAD module performs Command Recognition. In other examples, the processing device controls the first microphone and the second microphone by varying a clock frequency of a clock supplied to the first microphone and the second microphone.

In many of these embodiments, voice activity is detected in a micro-electro-mechanical system (MEMS) microphone. Sound energy is received from a source and the sound energy is filtered into a plurality of filter bands. A power estimate is obtained for each of the plurality of filter bands. Based upon each power estimate, a determination is made as to whether voice activity is detected.

In some aspects, the filtering utilizes one or more low pass filters, high pass filters and frequency dividers. In other examples, the power estimate comprises an upper power estimate and a lower power estimate. In some examples, ratios between the upper power estimate and the lower power estimate within the plurality of filter bands are determined, and selected ones of the ratios are compared to a predetermined threshold. In other examples, ratios between the upper power estimate and the lower power estimate between the plurality of filter bands are determined, and selected ones of the ratios are compared to a predetermined threshold.

Referring now to FIG. 1, a system 100 that utilizes Voice Activity Detection (VAD) approaches is described. The system 100 includes a first microphone element 102, a second microphone element 104, a right event microphone 106, a left event microphone 108, a digital signal processor (DSP)/codec 110, and an application processor 112. Although two microphones are shown in the system 100, it will be understood that any number of microphones may be used and not all of them require a VAD, but at least one.

The first microphone element 102 and the second microphone element 104 are microelectromechanical system (MEMS) elements that receive sound energy and convert the sound energy into electrical signals that represent the sound energy. In one example, the elements 102 and 104 include a MEMS die, a diaphragm, and a back plate. Other components may also be used.

The right event microphone 106 and the left event microphone 108 receive signals from the microphone elements 102 and 104, and process these signals. For example, the elements 106 and 108 may include buffers, preamplifiers, analog-to-digital (A-to-D) converters, and other processing elements that convert the analog signal received from elements 102 and 104 into digital signals and perform other processing functions. These elements may, for example, include an ASIC that implements these functions. The right event microphone 106 and the left event microphone 108 also include voice activity detection (VAD) modules 103 and 105 respectively and these may be implemented by an ASIC that executes programmed computer instructions. The VAD modules 103 and 105 utilize the approaches described herein to determine whether voice (or some other event) has been detected. This information is transmitted to the digital signal processor (DSP)/codec 110 and the application processor 112 for further processing. Also, the signals (potentially voice information) now in the form of digital information are sent to the digital signal processor (DSP)/codec 110 and the application processor 112.

The digital signal processor (DSP)/codec 110 receives signals from the elements 106 and 108 (including whether the VAD modules have detected voice) and looks for trigger words (e.g., "Hello, My Mobile") using a voice recognition (VR) trigger engine 120. The codec 110 also performs interrupt processing (see FIG. 2) using interrupt handling module 122. If the trigger word is found, a signal is sent to the application processor 112 to further process received information. For instance, the application processor 112 may utilize a VR recognition module 126 (e.g., implemented as hardware and/or software) to determine whether other or further commands can be recognized in the information.

In one example of the operation of the system of FIG. 1, the right event microphone 106 and/or the left event microphone 108 will wake up the digital signal processor (DSP)/codec 110 and the application processor 112 by starting to transmit pulse density modulation (PDM) data. General input/output (I/O) pins 113 of the digital signal processor (DSP)/codec 110 and the application processor 112 are assumed to be configurable for interrupts (or simply polling) as described below with respect to FIG. 2. The modules 103 and 105 may perform different recognition functions; one VAD module may perform Trigger Keyword recognition and a second VAD module may perform Command Recognition. In one aspect, the digital signal processor (DSP)/codec 110 and the application processor 112 control the right event microphone 106 and the left event microphone 108 by varying the clock frequency of the clock 124.

Figure 2:
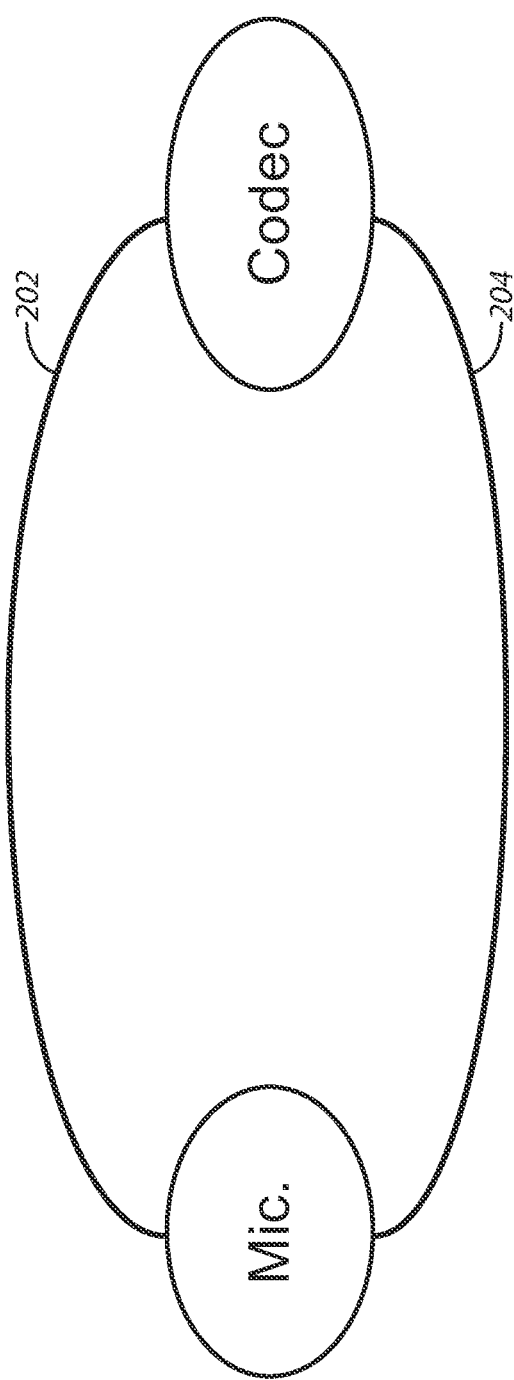
FIG. 2 is a state transition diagram showing an interrupt sequence.

Referring now to FIG. 2, one example of the bidirectional interrupt system that can be deployed in the approaches described herein is described. At step 202, the microphone 106 or 108 interrupts/wakes up the digital signal processor (DSP)/codec 110 in case of an event being detected. The event may be voice (e.g., it could be the start of the voice trigger word). At step 204, the digital signal processor (DSP)/codec 110 puts the microphone back in Event Detection mode in case no trigger word is present. The digital signal processor (DSP)/codec 110 determines when to change the microphone back to Event Detection mode. The internal VAD of the DSP/codec 110 could be used to make this decision and/or the internal voice trigger recognitions system of the DSP/Codec 110. For example, if the word trigger recognition didn't recognize any Trigger Word after approximately 2 or 3 seconds then it should configure its input/output pin to be an interrupt pin again and then set the microphone back into detecting mode (step 204 in FIG. 2) and then go into sleep mode/power down.

In another approach, the microphone may also track the time of contiguous voice activity. If activity does not persist beyond a certain countdown e.g., 5 seconds, and the microphone also stays in the low power VAD mode of operation, i.e. not put into a standard or high performance mode within that time frame, the implication is that the voice trigger was not detected within that period of detected voice activity, then there is no further activity and the microphone may initiate a change to detection mode from detect and transmit mode. A DSP/Codec on detecting no transmission from the microphone may also go to low power sleep mode.

Figure 3:
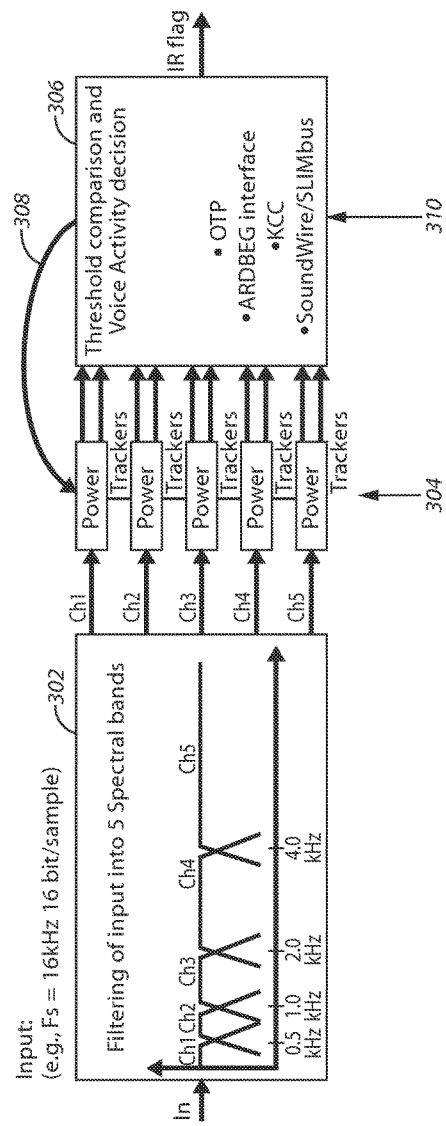
FIG. 3 is a block diagram of a VAD approach.

Referring now to FIG. 3, the VAD approaches described herein can include three functional blocks: an analyze filter bank 302, power tracker block or module 304, and a decision block or module 306. The analyze filter bank 302 filters the input signal into five spectral bands.

The power tracker block 304 includes an upper tracker and a lower tracker. For each of these and for each band it obtains a power estimate. The decision block 306 looks at the power estimates and determines if voice or an acoustic event is present.

Optionally, the threshold values can be set by a number of different approaches such as one time parts (OTPs), or various types of wired or wireless interfaces 310. Optionally feedback 308 from the decision block 306 can control the power trackers, this feedback could be the VAD decision. For example the trackers (described below) could be configured to use another set of attack/release constants if voice is present. The functions described herein can be deployed in any number of functional blocks and it will be understood that the three blocks described are examples only.

Figure 4:
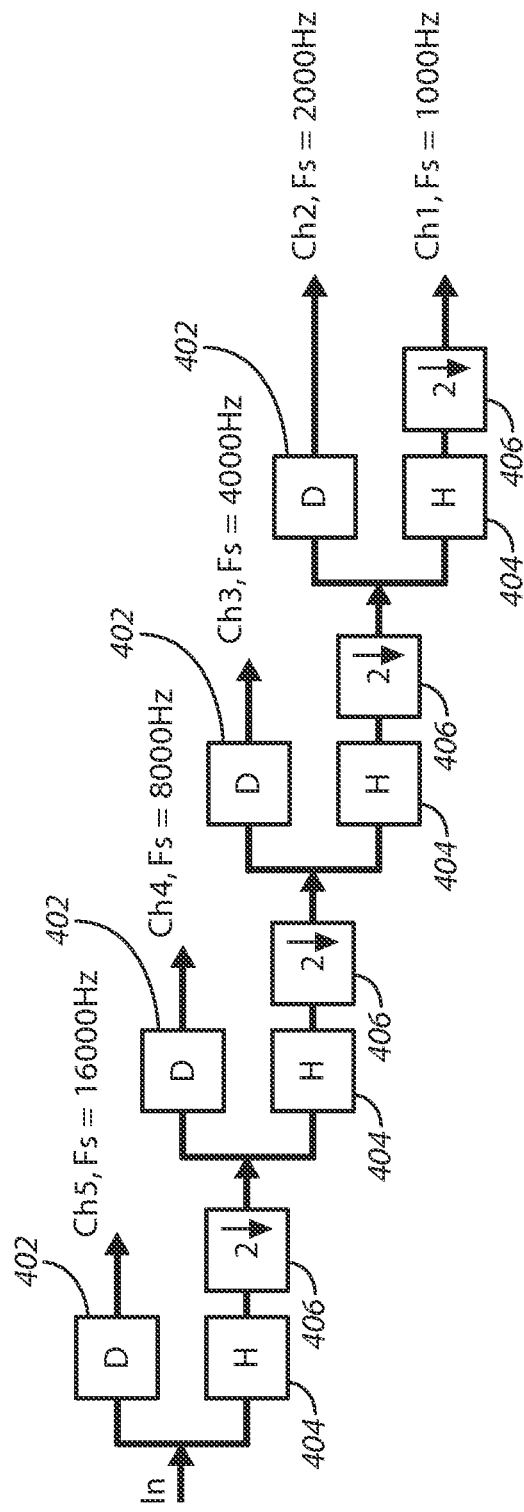
FIG. 4 is an analyze filter bank used in VAD.
Figure 5:
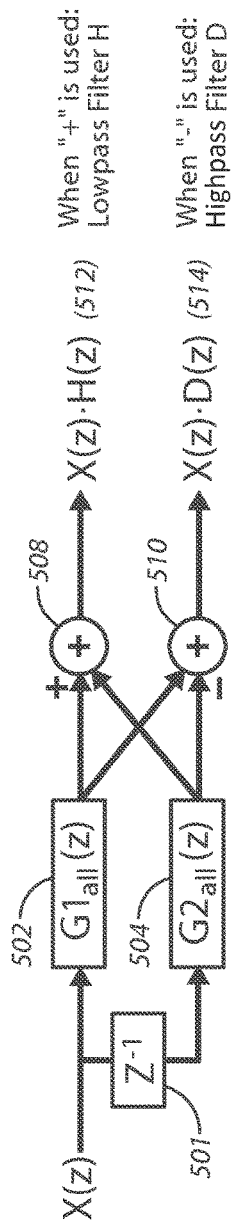
FIG. 5 is a block diagram of high pass and low pass filters used in an analyze filter bank.
Figure 6:
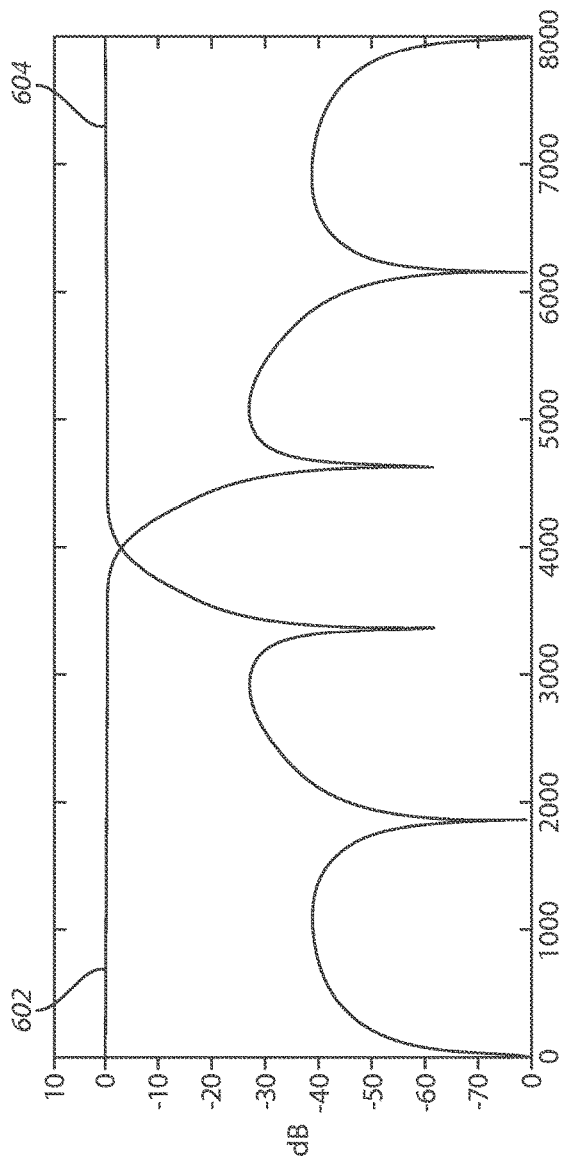
FIG. 6 is a graph of the results of the analyze filter bank.

Referring now to FIGS. 4, 5, and 6 one example of an analyze filter bank is described, the processing is very similar to the subband coding system, which may be implemented by the wavelet transform, by Quadrature Mirror Filters (QMF) or by other similar approaches. In FIG. 4, the decimation stage on the high pass filters (D) is omitted compared to the more traditional subband coding/wavelet transform method. The reason for the omission is that later in the signal processing step an estimation of the root mean square (RMS) of energy or power value is obtained and it is not desired to overlap in frequency between the low pass filtering (used to derive the "Mean" of RMS) and the pass band of the analyze filter bank. This approach will relax the filter requirement to the "Mean" low pass filter. However the decimation stage could be introduced as this would save computational requirements.

Referring now to FIG. 4, the filter bank includes high pass filters 402 (D), low pass filters 404 (H), and sample frequency dividers 406 (Fs is the sample frequency of the particular channel). This apparatus operates similarly to a sub-band coding approach and has a consistent relative bandwidth as the wavelet transforms. The incoming signal is separated into five bands. Other numbers of bands can also be used. In this example, channel 5 has a pass band between 4000 Hz to 8000 Hz; channel 4 has a pass band between 2000 Hz to 4000 Hz; channel 3 has a pass band between 1000 Hz to 2000 Hz; channel 2 has a pass band between 500 Hz to 1000 Hz; and channel 1 has a pass band between 0 Hz to 500 Hz.

Referring now to FIG. 5, the high pass filter and the low pass filter are constructed from two all pass filters 502 (G1) and 504 (G2). These filters could be first or second order all pass infinite impulse response (IIR) structures. The input signal X(z) passes through delay block 501. By changing the signs of adders 508 and 510, a low pass filtered sample 512 and a high pass filtered sample 514 are generated. Combining this structure with the decimation structure gives several benefits. For example, the order of the H and D filters are double (e.g., two times), and the number of gates and power are reduced in the system.

Referring now to FIG. 6, response curves for the high pass and low pass elements are shown. A first curve 602 shows the low pass filter response while a second curve 604 shows the high pass filter response.

Figure 7:
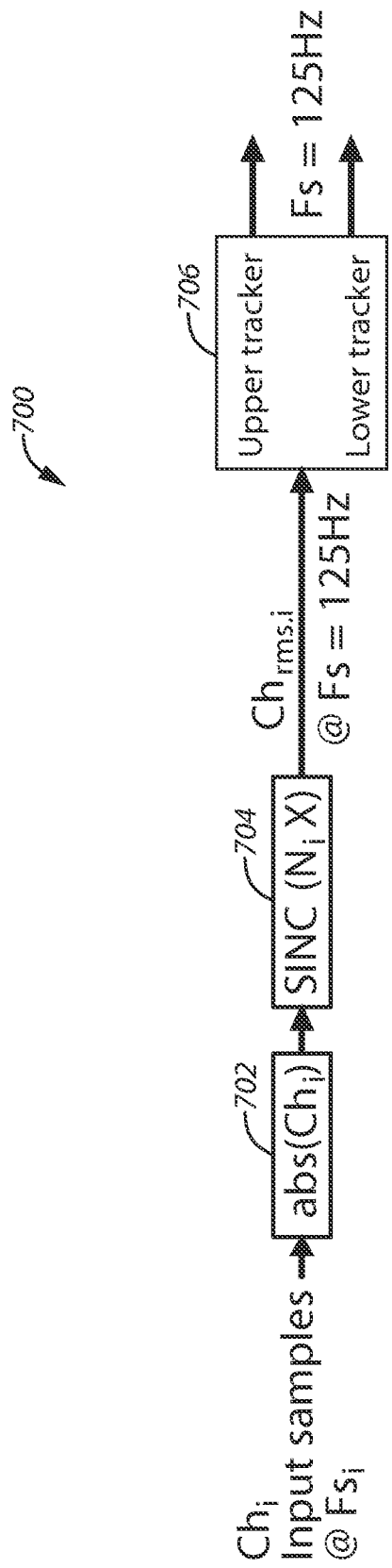
FIG. 7 is a block diagram of the tracker block.
Figure 8:
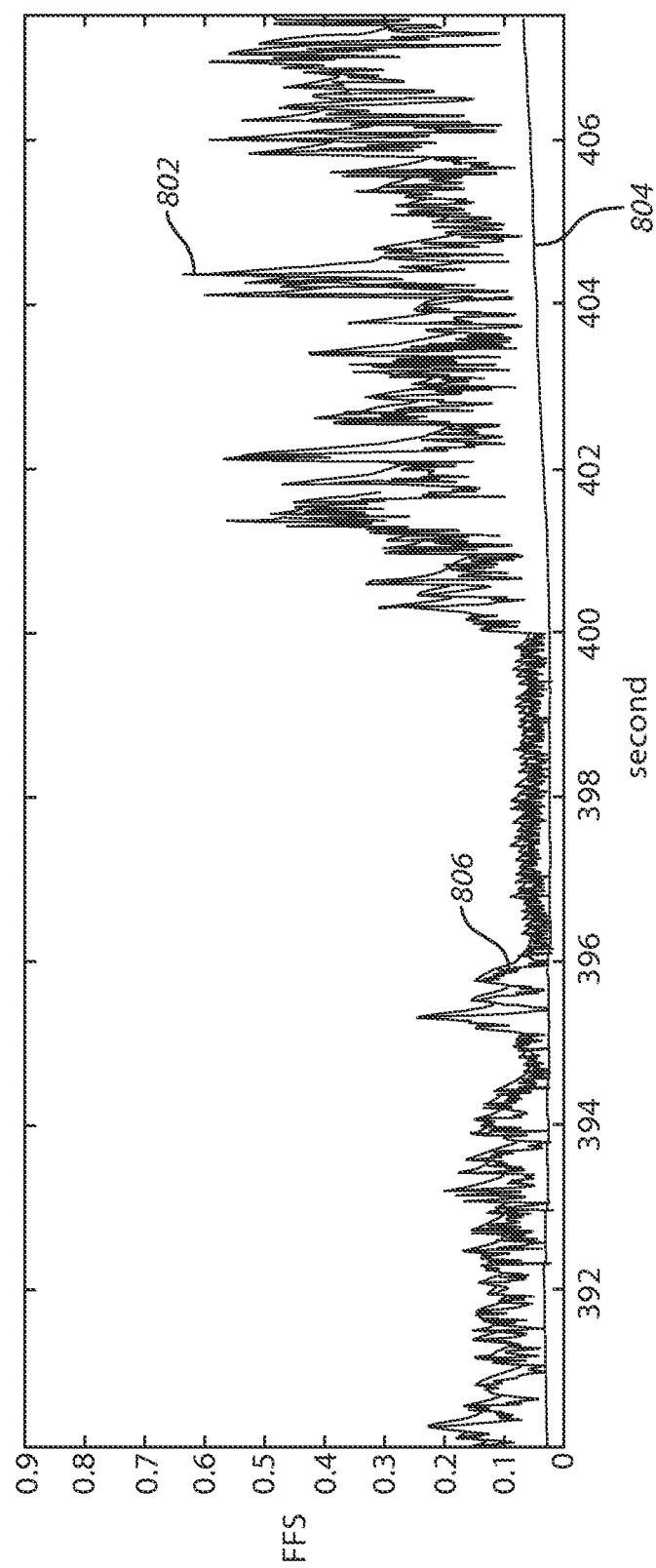
FIG. 8 is a graph of the results of the tracker block.

Referring now to FIGS. 7 and 8, one example of the power tracker block or module 700 is described. The tracker 700 includes an absolute value block 702, a SINC decimation block 704, and upper and lower tracker block 706. The block 702 obtains the absolute value of the signal (this could also be the square value). The SINC block 704 is a first order SINC with N decimation factor and it simply accumulates N absolute signal values and then dumps this data after a predetermined time (N sample periods). Optionally, any kind of decimation filter could be used. A short time RMS estimate is found by rectifying and averaging/decimating by the SINC block 704 (i.e., accumulation and dump, if squaring was used in block 704 then a square root operator could be introduced here as well). The above functions are performed for each channel, i=1 to 5. The decimation factors, N, are chosen so the sample rate of each short time RMS estimate is 125 Hz or 250 Hz except the DC channel (channel 1) where the sample rate is 62.5 Hz or 125 Hz. The short time rms ($Ch_{rms,\,i}$) values for each channel, i=1 to 5, are then fed into two trackers of the tracker block 706. A lower tracker and an upper tracker, i.e., one tracker pair for each channel are included in the tracker block 706. The operation of the tracker block 706 can be described as:

$$upper_i(n) = \begin{cases} upper_i(n-1) \cdot (1 - K_{aui}) + \\ \quad K_{aui} \cdot Ch_{rms,i}(n), & \text{if } Ch_{rms,i}(n) > upper_i(n-1) \\ upper_i(n-1) \cdot (1 - K_{rui}) + \\ \quad K_{rui} \cdot Ch_{rms,i}(n) & \text{otherwise} \end{cases}$$

$$lower_i(n) = \begin{cases} lower_i(n-1) \cdot (1 - K_{ali}) + \\ \quad K_{ali} \cdot Ch_{rms,i}(n), & \text{if } Ch_{rms,i}(n) < lower_i(n-1) \\ lower_i(n-1) \cdot (1 - K_{rli}) + \\ \quad K_{rli} \cdot Ch_{rms,i}(n) & \text{otherwise} \end{cases}$$

The sample index number is n, $Kau_i$ and $Kru_i$ are attack and release constants for the upper tracker channel number i. $Kal_i$ and $Krl_i$ are attack and release constants for the lower tracker for channel number i. The output of this block is fed to the decision block described below with respect to FIG. 9.

Referring now to FIG. 8, operation of the tracker block is described. A first curve 802 shows the upper tracker that follows fast changes in power or RMS. A second curve 804 shows the lower tracker following slower changes in the power or RMS. A third curve 806 represents the input signal to the tracker block.

Figure 9:
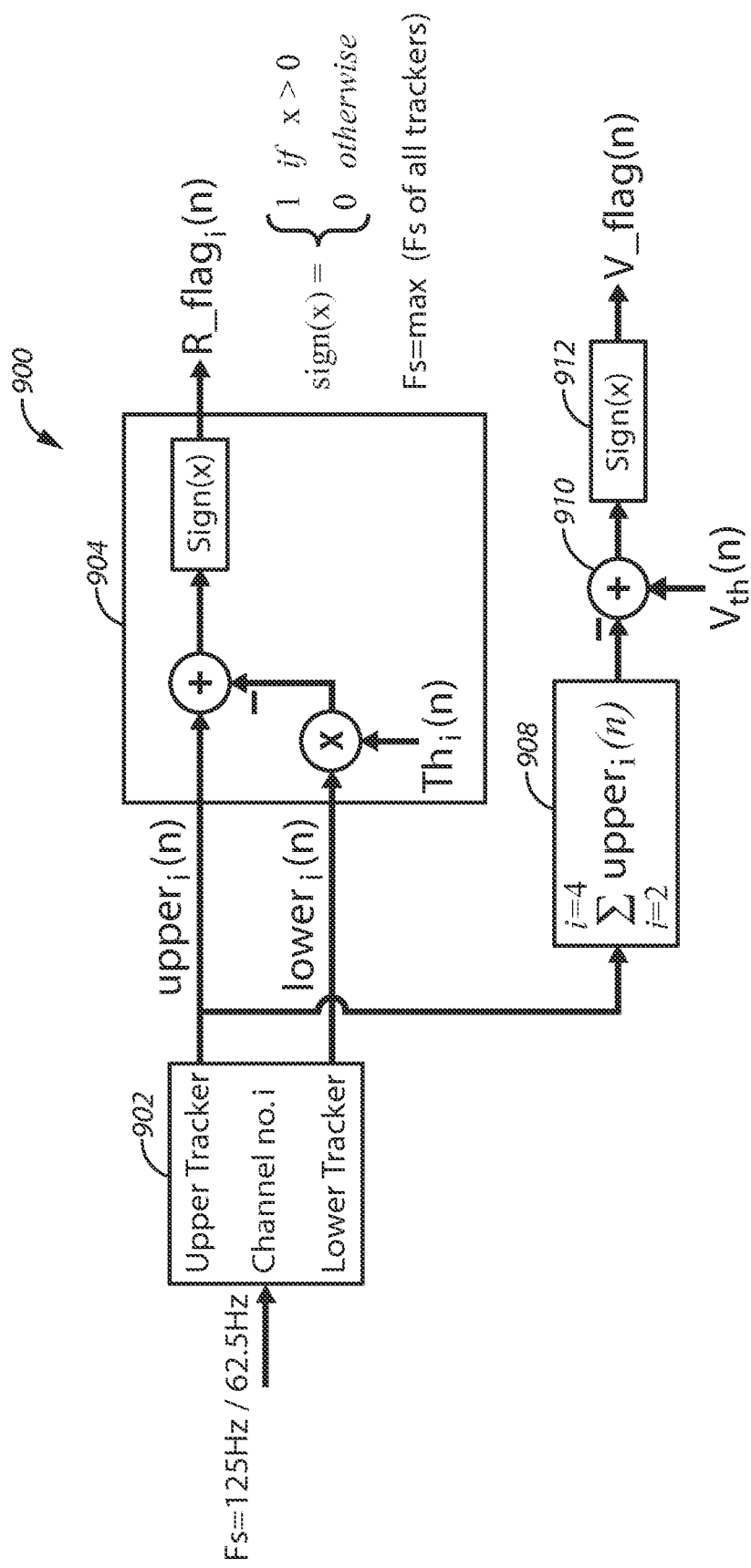
FIG. 9 is a block diagram of a decision block.

Referring now to FIG. 9, one example of a decision block 900 is described. Block 902 is redrawn in FIG. 9 in order to make it easier for the reader (blocks 706 and 902 are the same tracker blocks). The decision block uses the output from the trackers and includes a division block 904 to determine the ratio between the upper and lower tracker for each channel, summation block 908, comparison block 910, and sign block 912.

The internal operation of the division block 904 is structured and configured so that an actual division need not be made. The lower tracker value $lower_i(n)$ is multiplied by $Th_i(n)$ (a predetermined threshold which could be constant and independent of n or changed according to a rule). This is subtracted from the $upper_i(n)$ tracker value. The sign(x) function is then performed.

Upper and lower tracker signals are estimated by upper and lower tracker block 902 (this block is identical to block 706). The ratio between the upper tracker and the lower tracker is then calculated by division block 904. This ratio is compared with a threshold $Th_i(n)$. The flag $R\_flag_i(n)$ is set if the ratio is larger than the threshold $Th_i(n)$, i.e., if sign(x) in 904 is positive. This operation is performed for each channel i=1 to 5. $Th_i(n)$ could be constant over time for each channel or follow a rule where it actually changes for each sample instance n.

In addition to the ratio calculation for each channel i=1 to 5 (or 6 or 7 if more channels are available from the filterbank), the ratios between channels can also be used/calculated. The ratio between channels is defined for the i'th channel: $Ratio_{i,ch}(n)=upper_{i=ch}(n)/lower_{i\neq ch}(n)$, i, ch are from 1 to the number of channels which in this case is 5. This means that $ratio(n)_{i,i}$ is identical to the ratio calculated above. A total number of 25 ratios can be calculated (if 5 filter bands exist). Again, each of these ratios is compared with a Threshold $Th_{i,ch}(n)$. A total number of 25 thresholds exist if 5 channels are available. Again, the threshold can be constant over time n, or change for each sample instance n. In one implementation, not all of the ratios between bands will be used, only a subset.

The sample rate for all the flags is identical with the sample rate for the faster tracker of all the trackers. The slow trackers are repeated. A voice power flag $V\_flag(n)$ is also estimated as the sum of three channels from 500 Hz to 4000 Hz by summation block 908. This flag is set if the power level is low enough, (i.e., smaller than $V_{th}(n)$) and this is determined by comparison block 910 and sign block 912. This flag is only in effect when the microphone is in a quiet environment or/and the persons speaking are far away from the microphone.

The $R\_flagi(n)$ and $V\_flag(n)$ are used to decide if the current time step "n" is voice, and stored in $E\_flag(n)$. The operation that determines if E_flag (n) is voice (1) or not voice (0) can be described by the following:

---

E_flag(n) = 0;
If sum_from_1_to_5( R_flagi(n) ) > V_no (i.e., E_flag is set if at least V_no channels declared voice )
   E_flag(n) = 1
If R_flag1(n) == 0 and R_flag5(n) == 0
   E_flag(n) = 0
If V_flag(n) == 1
   E_flag(n) = 0

---

The final VAD_flag(n) is a smoothed version of the E_flag(n). It simply makes a VAD positive decision true for a minimum time/period of VAD_NUMBER of sample periods. This smoothing can be described by the following approach. This approach can be used to determine if a voice event is detected, but that the voice is present in the background and therefore of no interest. In this respect, a false positive reading is avoided.

---

VAD_flag(n)=0
If E_flag(n) == 1
   hang_on_count=VAD_NUMBER;
else
   if hang_on_count ~= 0
     decrement( hang_on_count)
     VAD_flag(n)=1
   end
end

---

Hang-on-count represents a time of app VAD_NUMBER/Sample Rate. Here Sample Rate are the fastest channel, i.e., 250, 125 or 62.5 Hz. It will be appreciated that these approaches examine to see if 4 flags have been set. However, it will be appreciated that any number of threshold values (flags) can be examined.

It will also be appreciated that other rules could be formulated like at least two pair of adjacent channel (or R_flag) are true or maybe three of such pairs or only one pair. These rules are predicated by the fact that human voice tends to be correlated in adjacent frequency channels, due to the acoustic production capabilities/limitations of the human vocal system.

Preferred embodiments are described herein, including the best mode. It should be understood that the illustrated embodiments are exemplary only, and should not be taken as limiting the scope of the appended claims.

What is claimed is:

1. A method in a microphone assembly including an acoustic sensor and a voice activity detector on an integrated circuit coupled to an external-device interface of the microphone assembly, the method comprising:
   receiving acoustic energy at the acoustic sensor;
   filtering data representative of the acoustic energy into a plurality of bands;
   obtaining a power estimate for at least one of the plurality of bands,
   the power estimate including a first estimate based on relatively fast changes in a power metric of the data representative of the acoustic energy and a second estimate based on relatively slow changes in a power metric of the data representative of the acoustic energy;
   determining whether voice activity is present in the acoustic energy based on the power estimate for the at least one band.

2. The method of claim 1, further comprising,
   determining a ratio of the first estimate and the second estimate of a corresponding band; and determining whether voice activity is present in the acoustic energy based on a comparison of the ratio to a predetermined threshold.

3. The method of claim 1,
obtaining a power estimate for each of the plurality of bands, each power estimate including a first estimate based on relatively fast changes in a power metric of the data representative of the acoustic energy and a second estimate based on relatively slow changes in a power metric of the data representative of the acoustic energy;
determining multiple ratios based on the first estimate and the second estimate of the plurality of bands;
determining whether voice activity is present in the acoustic energy based on a comparison of the multiple ratios to predetermined thresholds.

4. The method of claim 3, further comprising summing results of the comparisons and determining whether voice activity is present in the acoustic energy based on the summation of results.

5. The method of claim 3, determining the multiple ratios includes determining at least one ratio using the first estimate and the second estimate obtained for the same band.

6. The method of claim 3, determining the multiple ratios includes determining at least one ratio using the first estimate obtained for one band and the second estimate obtained for another band.

7. The method of claim 1, providing an interrupt signal at the external-device interface upon determining that voice activity is present in the acoustic energy.

8. A microphone assembly having an external-device interface, the microphone assembly comprising:
an acoustic sensor having an acoustic input and an electrical output;
a filter bank having an input coupled to the electrical output of the transducer, the filter bank configured to filter data representative of energy detected by the acoustic sensor into a plurality of frequency bands;
a power tracker having an input coupled to an output of the filter bank, the power tracker configured to obtain a power estimate for at least one of the plurality of frequency bands, the power estimate including a first estimate based on relatively fast changes in a power metric of the data representative of the acoustic energy and a second estimate based on relatively slow changes in a power metric of the data representative of the acoustic energy;
a comparison entity coupled to the output of the power tracker, the comparison entity configured to determine whether voice activity is present in the data representative of acoustic energy based upon the power estimate; and
a signal generator configured to generate a wake up signal upon determining that voice activity is present in the data representative of acoustic energy.

9. The microphone assembly of claim 8,
the power tracker configured to determine a ratio of the first estimate and the second estimate of a corresponding frequency band, and
the comparison entity configured to determine whether voice activity is present in the acoustic energy based on a comparison of the ratio to a predetermined threshold.

10. The microphone assembly of claim 8,
the power tracker configured to obtain a power estimate for each of the plurality of frequency bands, each power estimate including a first estimate based on relatively fast changes in a power metric of the data representative of the acoustic energy and a second estimate based on relatively slow changes in a power metric of the data representative of the acoustic energy,
the power tracker configured to determine multiple ratios based on the first estimate and the second estimate of the plurality of frequency bands,
the comparison entity configured to determine whether voice activity is present in the acoustic energy based on a comparison of the multiple ratios to predetermined thresholds.

11. The microphone assembly of claim 10, the comparison entity configured to sum results of the comparisons and to determine whether voice activity is present in the acoustic energy based on the summation of results.

12. The microphone assembly of claim 10, at least one of the multiple ratios includes a ratio of the first estimate and the second estimate for the same frequency band.

13. The microphone assembly of claim 10, at least one of the multiple ratios includes a ratio of the first estimate obtained for one frequency band and the second estimate obtained for another frequency band.

14. The microphone assembly of claim 8, a signal generator configured to provide the wake up signal at the external-device interface upon determining that voice activity is present in the acoustic energy.

15. The microphone assembly of claim 8, wherein the filter bank, the power tracker, the comparison entity, and the signal generator are implemented on an integrated circuit of the microphone assembly.

16. A microphone assembly having an external-device interface, the microphone assembly comprising:
an acoustic sensor having an acoustic input and an electrical output;
an analog to digital (A/D) converter coupled to the acoustic sensor, the A/D converter configured to generate a data representative of an electrical signal generated by the acoustic sensor;
a processor coupled to the A/D converter, the processor configured to:
filter the data representative of the electrical signal into a plurality of bands;
obtain a power estimate for at least one of the plurality of bands, the power estimate including a first estimate based on relatively fast changes in a power metric of the data representative of the acoustic energy and a second estimate based on relatively slow changes in a power metric of the data representative of the acoustic energy;
determine whether voice activity is present in the data representative of the electrical signal based upon the power estimate; and
generate a wake up signal upon determining that voice activity is present in the data representative of the electrical signal.

17. The microphone assembly of claim 16, the processor further configured to determine a ratio of the first estimate and the second estimate and to determine whether voice activity is present in the data representative of the electrical signal based on a comparison of the ratio to a predetermined threshold.

18. The microphone assembly of claim 16,
the processor configured to obtain a power estimate for each of the plurality of bands, each power estimate including a first estimate based on relatively fast changes in a power metric of the data representative of the acoustic energy and a second estimate based on relatively slow changes in a power metric of the data representative of the acoustic energy, the processor configured to determine multiple ratios based on the first estimate and the second estimate of the plurality of bands, and the processor configured to determine whether voice activity is present in the data representative of the electrical signal based on a comparison of the multiple ratios to predetermined thresholds.

19. The microphone assembly of claim 18, the processor configured to sum results of the comparisons and to determine whether voice activity is present in the data representative of the electrical signal based on the summation of results.

20. The microphone assembly of claim 16, the processor configured to provide the wake up signal at the external-device interface upon determining that voice activity is present in the data representative of the electrical signal.

* * * * *